(12) United States Patent
Kaupert

(10) Patent No.: US 8,865,357 B2
(45) Date of Patent: Oct. 21, 2014

(54) FUEL CELL SYSTEM AND MOTOR VEHICLE EQUIPPED THEREWITH

(75) Inventor: Andreas Kaupert, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 1165 days.

(21) Appl. No.: 12/478,959

(22) Filed: Jun. 5, 2009

(65) Prior Publication Data

US 2009/0305097 A1 Dec. 10, 2009

(30) Foreign Application Priority Data

Jun. 6, 2008 (DE) .......................... 10 2008 027 292

(51) Int. Cl.
*H01M 8/06* (2006.01)
*B60H 1/02* (2006.01)
*H01M 8/04* (2006.01)
*B60H 1/14* (2006.01)

(52) U.S. Cl.
CPC ............... *H01M 8/0612* (2013.01); *B60H 1/02* (2013.01); *H01M 2250/20* (2013.01); *H01M 8/04022* (2013.01); *B60H 1/143* (2013.01); *H01M 8/04223* (2013.01); *Y02T 90/32* (2013.01); *H01M 2250/405* (2013.01); *Y02E 60/50* (2013.01); *Y02B 90/16* (2013.01); *H01M 8/04097* (2013.01)
USPC .......................................... 429/408; 429/415

(58) Field of Classification Search
USPC ........................................................ 429/434
See application file for complete search history.

(56) References Cited

U.S. PATENT DOCUMENTS

| 6,416,891 | B1 * | 7/2002 | Condit et al. ................. 429/425 |
| 6,759,154 | B2 | 7/2004 | O'Brien et al. |
| 2005/0074644 | A1 * | 4/2005 | Ueda et al. ...................... 429/22 |
| 2005/0196659 | A1 * | 9/2005 | Grieve et al. .................... 429/34 |
| 2006/0112695 | A1 * | 6/2006 | Neubauer et al. ............... 60/714 |
| 2006/0292410 | A1 * | 12/2006 | Kaupert et al. ................. 429/20 |
| 2007/0074992 | A1 | 4/2007 | Fukuda et al. |
| 2007/0281201 | A1 * | 12/2007 | Sederquist et al. ............. 429/34 |
| 2008/0213636 | A1 | 9/2008 | Boltze |
| 2008/0261163 | A1 * | 10/2008 | Brenner et al. ............... 431/354 |

FOREIGN PATENT DOCUMENTS

| DE | 102005010935 A1 | 9/2006 |
| DE | 202006008898 U1 | 11/2006 |
| DE | 102005030474 A1 | 1/2007 |
| DE | 102006045673 A1 | 4/2008 |
| DE | 102006046676 A1 | 4/2008 |
| DE | 102006057357 A1 | 6/2008 |
| EP | 1 241 723 B1 | 9/2002 |
| JP | 2002154807 A | 5/2002 |
| WO | WO 2006/015676 | * 2/2006 |

* cited by examiner

*Primary Examiner* — Ula C Ruddock
*Assistant Examiner* — Jacob Marks
(74) *Attorney, Agent, or Firm* — McGlew and Tuttle, P.C.

(57) ABSTRACT

A fuel cell system (1), especially in a motor vehicle, is provided with at least one fuel cell (18) for generating electric current from anode gas and cathode gas, with at least one reformer (22) for generating anode gas from oxidant gas and fuel. At least one residual gas burner (26) is provided for burning anode waste gas with cathode waste gas. A recycling device (48) is provided for recycling burner waste gas to the reformer (22).

21 Claims, 2 Drawing Sheets

FUEL CELL SYSTEM AND MOTOR VEHICLE EQUIPPED THEREWITH

CROSS REFERENCE TO RELATED APPLICATIONS

This application claims the benefit of priority under 35 U.S.C. §119 of German Patent Application DE 10 2008 027 292.2 filed Jun. 6, 2008, the entire contents of which are incorporated herein by reference.

FIELD OF THE INVENTION

The present invention pertains to a fuel cell system as well as to a motor vehicle equipped therewith.

BACKGROUND OF THE INVENTION

A fuel cell system, which can be used especially in a motor vehicle, for example, as the only or additional power source, usually comprises at least one fuel cell for generating electric current from anode gas and cathode gas as well as at least one reformer for generating anode gas from oxidant gas and fuel. In addition, at least one residual gas burner may be provided, with which anode waste gas can be burned with cathode waste gas.

SUMMARY OF THE INVENTION

The present invention deals with the problem of proposing an improved embodiment for a fuel cell system of the type described in the introduction or for a motor vehicle equipped therewith, which embodiment is characterized especially in that the operation of the fuel cell system has increased stability and/or that pollutant emissions of the fuel cell system are reduced and/or manufacturing costs for a motor vehicle equipped with the fuel cell system are reduced.

According to the invention, a fuel cell system is provided with at least one fuel cell for generating electric current from anode gas and cathode gas. At least one reformer is provided for generating the anode gas from oxidant gas and fuel. At least one residual gas burner is provided for burning anode waste gas with cathode waste gas. A recycling means is provided for recycling burner waste gas to the reformer.

According to another aspect of the invention, a fuel cell system is provided, especially in a motor vehicle, The fuel cell system includes at least one fuel cell for generating electric current from anode gas and cathode gas as well as at least one reformer for generating anode gas from oxidant gas and fuel. At least one residual gas burner is provided for generating burner waste gas from anode waste gas and cathode waste gas. A first air supply means feeds the cathode gas to the at least one fuel cell via a first supply line with a second air supply means feeding the oxidant gas to the at least one reformer via a second supply line. A waste gas line removes the burner waste gas from the at least one residual gas burner. A first shut-off valve is provided for shutting off the first supply line, a second shut-off valve is provided for shutting off the second supply line and a third shut-off valve is provided for shutting off the waste gas line. A control means is provided for actuating the shut-off valves when the fuel cell system is turned off to shut off the respective line.

According to further aspect of the invention a motor vehicle is provided with a fuel cell system comprising at least one fuel cell for generating electric current from anode gas and cathode gas, at least one reformer for generating anode gas from oxidant gas and fuel and at least one residual gas burner for generating burner waste gas from anode waste gas and cathode waste gas. A waste gas line is provided removing burner waste gas from the residual gas burner. An air conditioning unit is provided for conditioning an air flow fed into the interior space of the vehicle. The air conditioning unit has a heating heat exchanger for heating the air flow wherein the heating heat exchanger of the air conditioning unit is integrated in the waste gas line of the fuel cell system.

According to a first solution, the present invention is based on the general idea of recycling burner waste gas of the residual gas burner to the reformer. A suitable recycling means is proposed for this. Recycled burner waste gas has a comparatively high temperature level, as a result of which heat can additionally be sent to the reformer. This heat can facilitate in the reformer especially the evaporation of the fuel, which is usually fed in the liquid form, and thus stabilize the operation of the reformer. On the whole, the efficiency of the reformer and of the fuel cell system equipped therewith can be increased as a result.

In a second solution, the present invention is based on the general idea of shutting off all the interfaces directly communicating with the environment of the fuel cell system or of the vehicle equipped therewith when the fuel cell system is turned off. These interfaces are at least a fresh air line, via which the reformer or the fuel cell is supplied with fresh air from the environment, as well as a waste gas line, via which burner waste gas is removed from the residual gas burner into the environment. By shutting off these lines, it can be guaranteed in a switched-off fuel cell system that no educts of the fuel cell system will escape from the fuel cell system due to creeping processes, evaporation effects and the like when it is turned off. For example, unreacted fuel and unreacted anode waste gas cannot enter the said lines when the fuel cell system is turned off. Emission of these substances can be effectively avoided by shutting off these lines.

According to a third solution, the present invention is based on the general idea of connecting a heating heat exchanger of an air conditioning unit of a motor vehicle, which is equipped with the fuel cell system, and which is used to heat the air of the interior space of the vehicle, to a waste gas line removing burner waste gas from the residual gas burner of the fuel cell system. While the heating heat exchanger of the air conditioning unit is integrated in a cooling circuit of an internal combustion engine of the vehicle in a conventional vehicle, coupling of the air conditioning unit with the cooling circuit of the internal combustion engine can be omitted in the design being proposed. This has, on the one hand, cost advantages and leads, on the other hand, to more rapid heating in case of a cold start, because it is not necessary to wait until the coolant in the cooling circuit of the internal combustion engine reaches a sufficient temperature, which is suitable for heating the air of the interior space, due to the operation of the internal combustion engine. Furthermore, the design being proposed is especially effective because only heat transmission, namely, from the waste gas directly to the air of the interior space, is necessary, whereas two heat transmissions with corresponding losses, namely, from the internal combustion engine to the coolant, on the one hand, and from the coolant to the air of the interior space, on the other hand, are necessary in the conventional design.

The alternative solutions according to the present invention, which were mentioned above, can be embodied individually as well as in any combination.

Other important features and advantages of the present invention appear from the subclaims, from the drawings and from the corresponding description of the figures on the basis of the drawings.

It is apparent that the above-mentioned features, which will also be explained below, can be applied not only in the particular combination indicated, but also in other combinations or alone without going beyond the scope of the present invention.

Preferred exemplary embodiments of the present invention are shown in the drawings and will be explained in more detail in the following description, identical reference numbers referring to identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
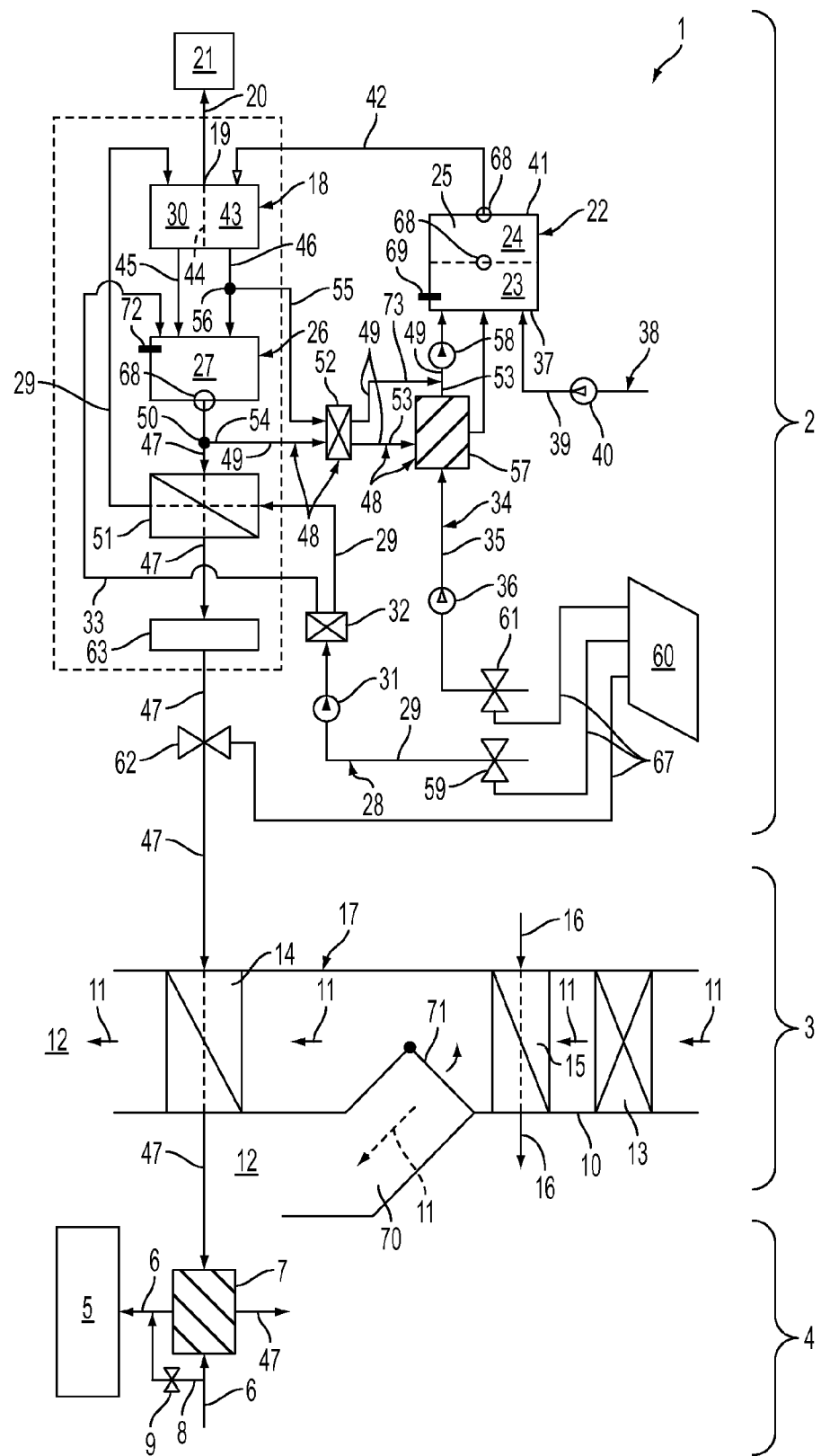
FIG. 1 is a greatly simplified, circuit diagram-like general view of a motor vehicle with a fuel cell system.

Referring to the drawings in particular, corresponding to FIG. 1, a motor vehicle 1, shown only partly, has a fuel cell system 2 indicated by a bracket, an air conditioning unit 3 indicated by a bracket, as well as an internal combustion engine 4 indicated by a bracket. The motor vehicle 1 may be a passenger car or a utility vehicle. Furthermore, the vehicle may be equipped with a hybrid drive, i.e., have, in addition to the internal combustion engine, an electric motor, which is not shown here and whose power supply can be embodied at least partly by means of the fuel cell system 2. The fuel cell system 2 is used to generate electric current and may be used within the vehicle 1 as the only power supply or as an additional power supply.

The internal combustion engine 4 comprises a combustion engine 5 shown in a simplified form here as well as a cooling circuit 6 for cooling the internal combustion engine 5. The cooling circuit 6 is shown only partially. A heat exchanger 7, via which heat can be fed to the cooling circuit 6 if a coolant of the cooling circuit 6 reaches its operating temperature more rapidly in case of a cold start of the internal combustion engine 5, may be integrated in this cooling circuit 6. To bypass the heat exchanger 7, the cooling circuit 6 may have a bypass 8, which can be activated or deactivated with a shut-off valve 9.

The air conditioning unit 3 comprises especially a duct 10, with which air can be fed to the interior space 12 of the vehicle corresponding to the arrows 11. A blower 13 for driving the air 11 is preferably located in this duct 10. Furthermore, the duct 11 contains a heating heat exchanger 14 for heating the air 11 fed into the interior space 12. In addition, a cooling heat exchanger 15, by means of which the air 11 can be cooled and/or dried when needed, is arranged in the duct 10 upstream of the heating heat exchanger 14 in the example being shown. This cooling heat exchanger 15 is integrated for this purpose in a cooling circuit 16 of the air conditioning unit 3. In the exemplary embodiment being shown, the duct 10 is equipped between the cooling heat exchanger 15 and the heating heat exchanger 14 with a controllable branching 70, which makes it possible to bypass the heating heat exchanger 14. A final control element 71, which is designed symbolically as a flap here, shuts off the bypass or the branching 70 in the state being shown. In another end position, it can shut off the air flow 11 to the heating heat exchanger 14. Any desired intermediate positions are conceivable as well. The branching 70 or the bypass 70 also leads to the interior space 12. Branching 70 is needed, for example, when cooled air is to be fed into the interior space 12 during the operation of the fuel cell system 1. In an alternative embodiment, the cooling heat exchanger 15 may also be arranged, in principle, downstream of the heating heat exchanger 14 in the duct 10. Duct 10 advantageously forms, at least with the heating heat exchanger 14, an air conditioning module 17 of the air conditioning unit 3, which module can be preassembled as one unit and can be installed in the vehicle 1 in an especially simple manner. This air conditioning module 17 may optionally also contain the cooling heat exchanger 15 and/or the blower 13.

The fuel cell system 2 comprises at least one fuel cell 18, which usually comprises a stack of individual fuel cell elements. The fuel cell 18 is used to generate electric current from an anode gas, which contains hydrogen gas, and from a cathode gas, which contains oxygen gas. The current generated by the fuel cell 18 can be tapped at least one supply point 19 and can be fed via a power line 20 to any desired power user 21. The power user 21 may be a certain component or certain components of the vehicle 1; the user 21 may also be, in general, an on-board electrical system of vehicle 1.

The fuel cell system 2 has, besides, a reformer 22, which is designed such that the anode gas can be generated with it, namely, from a fuel and from an oxidant gas. The fuel is any desired hydrocarbon, for example, diesel oil, gasoline, biodiesel or other synthetic fuel. The fuel with which the internal combustion engine 5 of the vehicle 1 is also operated is preferably used. Air is preferably used as the oxidant gas. The reformer 22 contains, for example, a pre-reaction space 23 and a reaction space 24. For example, evaporation of the fuel fed in the liquid form takes place in the pre-reaction space 23. Furthermore, mixing of the evaporated fuel with the oxidant gas fed in takes place in the pre-reaction space 23. The evaporation and mixing can be embodied, for example, by means of a so-called cold flame, where part of the fuel fed in is reacted. For example, partial oxidation of the fuel takes place in the reaction space 24, as a result of which the hydrocarbons are converted essentially into hydrogen and carbon monoxide. The reaction space 24 preferably contains a catalyst 25 for this.

The fuel cell system 2 has, in addition, a residual gas burner 26, in which anode waste gas, which may contain hydrogen gas, is reacted or burned with cathode waste gas, which may contain oxygen gas. The residual gas burner 26 contains for this a combustion chamber 27, in which the combustion reaction takes place either with open flame or catalytically. The combustion chamber 27 contains a corresponding catalyst in case of catalytic combustion.

A first air supply means 28 is provided to supply the fuel cell 18 with cathode gas, which is preferably air. This first air supply means comprises a first supply line 29, which is connected to a cathode side 30 of the fuel cell 18. The first supply line 29 contains a first delivery means 31 for driving the cathode gas, which may be a blower or a pump. The first supply line 29 contains, besides, a distributor means 32 in the example, in which a cooling gas line 33 branches off from the first supply line 29. The cooling gas line 33 is connected to the residual gas burner 26 and is used to feed a suitable cooling gas, especially air, to the residual gas burner 26. The air stream of the first air supply means 28 can be fed to the fuel cell 18 and to the residual gas burner 26 according to the needs with the distributor means 32, which may be, for example, a valve arrangement. The distributor means 32 can be controlled in a suitable manner for this.

To supply the reformer 22 with the oxidant gas, a second air supply means 34 is provided, which has a second supply line 35. The second supply line 35 contains, for example, a second delivery means 36, for example, a blower or a pump. The second supply line 35 is connected to an inlet side 37 of the reformer 22. To supply the reformer 22 with fuel, a fuel supply means 38 is provided, which has a fuel line 39, which is connected to the inlet side 37 of the reformer 22 and which contains a delivery means 40, for example, a pump. Reformer 22 is connected on its outlet side 41 via an anode gas line 42 to an anode side 43 of the fuel cell 18. The anode gas generated by the reformer 22 reaches as a result the fuel cell 18. The fuel cell 18 contains an electrolyte 44, which separates the anode side 43 from the cathode side 30.

The cathode waste gas reaches via a cathode waste gas line 45 the residual gas burner 26 from the cathode side 30 of the fuel cell 17. Analogously hereto, the anode waste gas reaches via an anode waste gas line 46 the residual gas burner 26 from the anode side 43 of the fuel cell 18. The burner waste gas generated by the residual gas burner 26 is removed from the residual gas burner 26 via a waste gas line 47.

The fuel cell system 1 has, moreover, a recycling means 48, which is designed such that burner waste gas can be recycled with it from the residual gas burner 26 to the reformer 22. The recycling means 48 has a return line 49 for this, which removes burner waste gas at a suitable tapping point 50 and feeds this to the inlet side 37 of the reformer 22. The tapping point 50 is located in the example in the waste gas line 47 between the residual gas burner 46 and a main heat exchanger 51. The burner waste gas tapping point 50 may also be arranged, in principle, directly at the residual gas burner 26. The recycling means 48 is designed, moreover, in the example being shown such that anode waste gas can also be recycled with it from the fuel cell 18 to the reformer 22. This may take place, in principle, via a separate return line. However, the recycling means 48 is equipped with a valve arrangement 52 in the example. This valve arrangement 52 is connected to the reformer 22 on the outlet side via at least one first return line section 53 and to the burner waste gas tapping point 50 on the inlet side via a second return line section 54 and to an anode waste gas tapping point 56 via a third return line section 55. Said tapping point 56 for anode waste gas is formed in the example on the anode waste gas line 46. However, this may, in principle, also be located directly at the fuel cell 18. The operation of the reformer 22 can be stabilized by the recycling of the burner waste gas. The efficiency of the fuel cell system 2 can be improved hereby. The recycling of anode waste gas, which contains, as a rule, more or less water vapor and hydrogen gas, may also bring about an improvement of the reformer operation. It may be advantageous now to control the recycling of burner waste gas and/or anode waste gas as a function of the current state of operation of the reformer 22 or of the fuel cell system 2.

The recycling means 48 has a recycling heat exchanger 57 as well as a delivery means 58, for example, a pump or a compressor. The recycling heat exchanger 57 is integrated, on the one hand, into the return line 49 and into the first return line section 53, while it is integrated, on the other hand, into the second supply line 35. The recycled burner waste gas or the recycled anode waste gas can be cooled hereby, for example, in order to prevent overheating of the delivery means 58, which is arranged for this in the return line 49 or in the second return line section 53 downstream of the recycling heat exchanger 57. The heat recycled via the recycled burner waste gas or anode waste gas nevertheless enters the reformer 22, doing so via the oxidant gas heated by means of the recycled gas.

In addition, a bypass section 73 may be provided, which, starting from the valve arrangement 52, bypasses the recycling heat exchanger 57 in order to thus connect the third return line section 55 directly to the part of the first return line section 53 leading to the reformer 22, doing so upstream of the delivery means 58. This may be advantageous for the cold start of the fuel cell system 1 when burner waste gas or anode waste gas, whose temperature is still uncritical for the delivery means 58, can be recycled. Heat loss due to the heating of the recycling heat exchanger 57 during cold start can be avoided hereby. The valve arrangement 52 can thus connect the second return line section 54 and the third return line section 55 to the first return line section 53 and to the bypass section 73 as desired, and it is possible, in particular, to set any desired mixing ratio.

A first shut-off valve 59, by means of which the first supply line 29 can be shut off, is arranged in the first supply line 29 in the fuel cell system 2 being shown here. The first shut-off valve 59 is connected for this to a control means 60. A second shut-off valve 61, by means of which the second supply line 35 can be shut off and which is likewise connected to the control means 60 for this, is arranged in the second supply line 35. A third shut-off valve 62, by means of which the waste gas line 47 can be shut off, for which purpose the third shut-off valve 62 is likewise connected to the control means 60, is arranged in the waste gas line 47.

The first shut-off valve 59 is preferably located upstream of the first delivery means 31. The second shut-off valve 61 is likewise located preferably upstream of the second delivery means 36. The third shut-off valve 62 is located, at any rate, downstream of the residual gas burner 26. It is arranged downstream of the main heat exchanger 51 and especially also downstream of an oxidation catalytic converter 63 in the example. The control means 60 is preferably designed such that it actuates the shut-off valves 59, 61, 62 when the fuel cell system 2 is turned off to shut off the respective line 29, 35, 47. As a consequence, the fuel cell system 2 is hermetically closed to the outside with respect to its educts when it is turned off.

Figure 2:
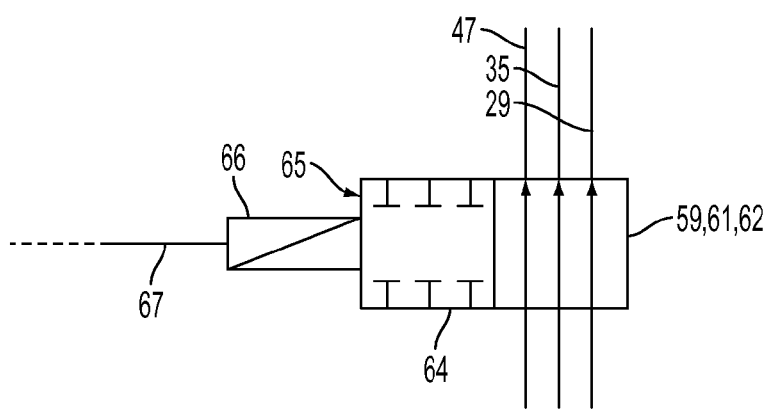
FIG. 2 is a greatly simplified, pictogram-like view of a shut-off valve arrangement.

Three separate shut-off valves 59, 61, 62 are provided in the example according to FIG. 1. However, it is possible, in principle, according to FIG. 2 to combine at least two of the shut-off valves 59, 61, 62 in a common housing 64 into a shut-off valve arrangement 65. In particular, the first two shut-off valves 59, 61 for controlling the supply lines 29, 35 can be combined in an especially simple manner. FIG. 2 shows as an example an embodiment in which all three shut-off valves 59, 61, 62 are combined into a shut-off valve arrangement 65. This shut-off valve arrangement 65 has a common actuator 66, with which the shut-off valves 59, 61, 62 of the shut-off valve arrangement 65 can be controlled together or simultaneously.

As was already mentioned above, the fuel cell system 2 comprises a main heat exchanger 51, which is arranged in the waste gas line 47, on the one hand, and in the cathode waste gas line 29, on the other hand. The cathode gas can be preheated hereby with the burner waste gas. Furthermore, the waste gas line 47 also contains here the above-mentioned oxidation catalytic converter 63, which is arranged downstream of the main heat exchanger 51 here, but it may, in principle, also be arranged upstream thereof in the waste gas line 47.

The embodiment being shown here, in which the heating heat exchanger 14 of the air conditioning unit 3 is connected to the waste gas line 47 of the fuel cell system 2, is especially advantageous. As a result, the residual heat of the burner waste gas can be used to heat up the air 11 of the interior space. On the one hand, this leads to the advantageous additional utilization of the waste heat of the burner waste gas. On the other hand, the air conditioning unit 3 can be made especially effective and can be caused to respond especially rapidly. The air conditioning unit 3 advantageously heats the air 11 fed into the interior space 12 exclusively with this heating heat exchanger 14. A conventional heat exchanger, which is integrated, for example, in the cooling circuit 6 of the internal combustion engine 4, to heat up the air 11 of the interior space, can be correspondingly eliminated.

In addition, the heat exchanger 7, which is associated with the cooling circuit 6 of the internal combustion engine 4 and which will hereinafter be called an auxiliary heat exchanger 7, is connected to the waste gas line 47 of the fuel cell system 2 in the example being shown. This auxiliary heat exchanger 7 is thus located, on the one hand, in the cooling circuit 6 of the internal combustion engine 4 and, on the other hand, in the waste gas line 47 of the fuel cell system 2. It is possible in this manner to heat the coolant of the cooling circuit 6 by means of the waste heat of the burner waste gas, for example, in order to heat the internal combustion engine 5 during cold start or before a cold start. The auxiliary heat exchanger 7 is located within the waste gas line 47, at any rate downstream of the main heat exchanger 51. In addition, it is arranged in the example downstream of the heating heat exchanger 14, but it may, in principle, also be arranged upstream of the heating heat exchanger 14.

The control means 60 is connected via control lines 67 to the shut-off valves 59, 61, 62 or to the shut-off valve arrangement 65. Furthermore, the control means 60 may be connected to the delivery means 31, 36, 40, 58 via suitable control lines, which are not shown here. In addition, the control means 60 may be connected to the valve arrangements 32, 52. Furthermore, the fuel cell system 2 comprises a sensor system, for example, a plurality of temperature sensors and/or pressure sensors. In addition, NOX sensors and sensors may be provided. A plurality of temperature sensors 68 are indicated as examples. In addition, reformer 22 is equipped here with an igniting means, which makes it possible, in particular, to also operate the reformer 22 as a burner for the cold start. Furthermore, the residual gas burner 26 may also be equipped with an ignition means 72.

While specific embodiments of the invention have been shown and described in detail to illustrate the application of the principles of the invention, it will be understood that the invention may be embodied otherwise without departing from such principles.

What is claimed is:

1. A fuel cell system comprising:
   a reformer for generating anode gas from oxidant gas and fuel;
   a fuel cell for generating electric current from the anode gas generated and from cathode gas;
   a residual gas burner for burning anode waste gas with cathode waste gas from said fuel cell, wherein said residual burner generates burner waste gas; and
   a recycling means for recycling burner waste gas to said reformer, said recycling means comprising a valve arrangement, said valve arrangement having an outlet side and an inlet side, said outlet side being connected to said reformer via at least one first return line section, said inlet side being connected to a burner waste gas tapping point via a second return line section and said inlet side being connected to an anode waste gas tapping point via a third return line section, said anode waste gas tapping point comprising two anode waste gas tapping portions, wherein one of said anode waste gas tapping portions supplies anode waste gas to said residual burner and another one of said anode waste gas tapping portions supplies anode waste gas to said reformer via at least said valve arrangement, said valve arrangement comprising one or more valves, said burner waste gas being transferred from said residual gas burner to said valve arrangement via said second return line section to define at least a portion of a burner waste gas flow path.

2. A fuel cell system in accordance with claim 1, wherein said recycling means is also for recycling anode waste gas to said reformer, said anode waste gas tapping point being located between said fuel cell and said residual gas burner, said anode waste gas being transferred from said anode waste gas tapping point to said valve arrangement via said second return line section to define at least a portion of an anode waste gas flow path.

3. A fuel cell system in accordance with claim 1, further comprising:
   an air supply means for supplying said fuel cell with cathode gas via a supply line; and
   a shut-off valve arranged in said supply line for shutting off said supply line when the fuel cell system is turned off.

4. A fuel cell system in accordance with claim 3, further comprising:
   another air supply means for supplying said reformer with oxidant gas via another supply line; and
   another shut-off valve arranged in said another supply line for shutting off said another supply line when the fuel cell system is turned off.

5. A fuel cell system in accordance with claim 4, further comprising:
   a waste gas line removing the burner waste gas from said residual gas burner; and
   a further shut-off valve arranged in said waste gas line for shutting off the waste gas line when the fuel cell system is turned off.

6. A fuel cell system in accordance with claim 5, further comprising:
   a control means coupled with said valve arrangement and at least one of said shut-off valve, said another shut-off valve and said further shut-off valve for shutting off the respective line when the fuel cell system is turned off and for selecting a position of said valve arrangement, wherein said control means switches said valve arrangement between a first position and a second position, at least said first return line section being in communication with said second return line section and said third return line section with said valve arrangement in said first position, said third return line section being in communication with a bypass line with said valve arrangement in said second position, said bypass line being connected to said outlet side, said bypass line bypassing a heat exchanger, wherein non-cooled anode waste gas is transferred to said reformer via said bypass line with said valve arrangement in said second position.

7. A fuel cell system in accordance with claim 5, wherein at least two of said shut-off valve, said another shut-off valve and said further shut-off valve are combined in a common housing to form a shut-off valve arrangement.

8. A fuel cell system in accordance with claim 7, wherein the shut-off valve arrangement has a common actuator with which the at least two shut-off valves of a shut-off valve arrangement are simultaneously actuatable.

9. A fuel cell system in accordance with claim 1, further comprising:
 a waste gas line removing the burner waste gas from the residual gas burner; and
 a main heat exchanger for preheating the cathode waste gas, said main heat exchanger being arranged in said waste gas line, said main heat exchanger receiving said burner waste gas from said residual gas burner via said waste gas line.

10. A fuel cell system in accordance with claim 9, further comprising:
 a motor vehicle equipped with said fuel cell, said reformer, said residual gas burner and said recycling means as well as a motor vehicle air conditioning unit; and
 a heating heat exchanger arranged in said air conditioning unit, said heating heat exchanger for heating air fed into the interior space of the motor vehicle, said heating heat exchanger being arranged in the waste gas line downstream of said main heat exchanger.

11. A fuel cell system in accordance with claim 10, wherein said air conditioning unit heats the air fed into the interior space of the vehicle exclusively with the heating heat exchanger.

12. A fuel cell system in accordance with claim 10, wherein the waste gas line is connected to an air conditioning module of said air conditioning unit, said module containing said heating heat exchanger.

13. A fuel cell system in accordance with claim 10, further comprising:
 an auxiliary heat exchanger arranged in a cooling circuit of an internal combustion engine of said motor vehicle, said auxiliary heat exchanger for heating a coolant of said cooling circuit during a cold start of the internal combustion engine, said auxiliary heat exchanger being arranged in the waste gas line downstream of said main heat exchanger, wherein said auxiliary heat exchanger is arrangable in the waste gas line upstream or downstream of said heating heat exchanger.

14. A fuel cell system in accordance with claim 1, wherein said another one of said anode waste gas tapping portions is located upstream of said fuel cell.

15. A fuel cell system comprising:
 a reformer for generating anode gas from oxidant gas and fuel;
 a fuel cell for generating electric current from the anode gas generated and from cathode gas;
 a residual gas burner for burning anode waste gas with cathode waste gas from said fuel cell, wherein said residual burner generates burner waste gas; and
 a recycling means for recycling fluid to said reformer, said recycling means comprising a valve arrangement, said valve arrangement having an outlet side and an inlet side, said outlet side being connected to said reformer, said inlet side being connected to a burner waste gas tapping point and an anode waste gas tapping point, said anode waste gas tapping point having a first anode waste gas tapping portion and a second anode waste gas tapping portion, wherein anode waste gas is supplied to said residual burner via said first anode waste gas tapping portion and anode waste gas is supplied to said reformer via at least said second anode waste gas tapping portion and said valve arrangement, said valve arrangement comprising one or more valves, wherein said burner waste gas is transferred from said burner waste gas tapping point to said valve arrangement.

16. A fuel cell system in accordance with claim 15, wherein said second anode waste gas tapping portion is located upstream of said fuel cell.

17. A fuel cell system in accordance with claim 15, wherein said first anode waste gas tapping portion is located between said residual gas burner and said fuel cell.

18. A fuel cell system comprising:
 a reformer for generating anode gas from oxidant gas and fuel;
 a fuel cell for generating electric current from the anode gas generated and from cathode gas, said fuel cell generating anode waste gas;
 a residual gas burner for burning anode waste gas with cathode waste gas from said fuel cell, wherein said residual burner generates burner waste gas; and
 a recycling means for recycling fluid to said reformer, said recycling means comprising a valve arrangement, said valve arrangement having an outlet side and an inlet side, said outlet side being connected to said reformer, said inlet side being connected to a burner waste gas tapping point and an anode waste gas tapping point, said anode waste gas tapping point comprising two anode waste gas tapping portions, wherein anode waste gas is supplied to said residual burner via one of said two anode waste gas tapping portions and anode waste gas is supplied to said reformer via at least said valve arrangement and another one of said two anode waste gas tapping portions, said valve arrangement comprising one or more valves, said burner waste gas being transferred from said burner waste gas tapping point to at least said valve arrangement.

19. A fuel cell system in accordance with claim 18, wherein said another one of said two anode waste gas tapping portions is located upstream of said fuel cell.

20. A fuel cell system in accordance with claim 18, wherein said one of said anode waste gas tapping portions is located between said residual gas burner and said fuel cell.

21. A fuel cell system in accordance with claim 18, wherein said burner waste gas is transferred from said burner waste gas tapping point to said reformer via at least said valve arrangement.

* * * * *